No. 867,207. PATENTED SEPT. 24, 1907.
A. J. McCOLLUM.
FLY WHEEL CONSTRUCTION FOR GAS ENGINES.
APPLICATION FILED DEC. 21, 1906.
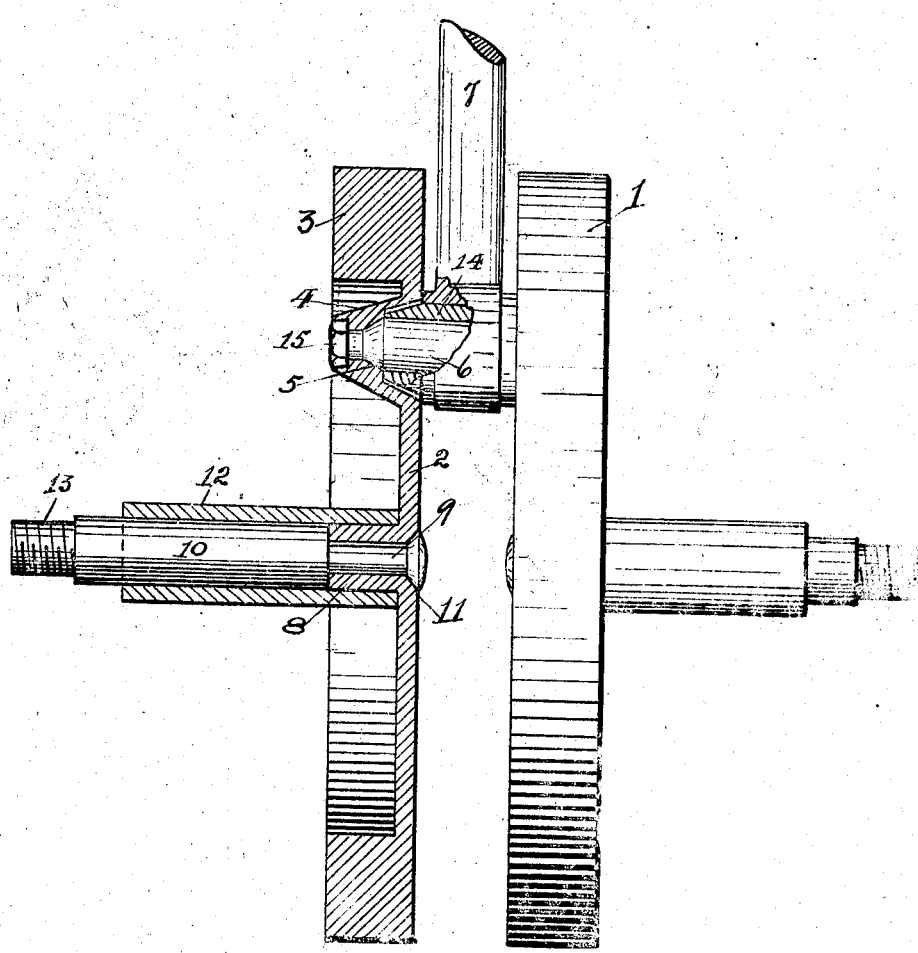

UNITED STATES PATENT OFFICE.

ARCHIBALD J. McCOLLUM, OF CHICAGO, ILLINOIS, ASSIGNOR TO ARMAC MOTOR COMPANY, OF CHICAGO, ILLINOIS, A CORPORATION OF ILLINOIS.

FLY-WHEEL CONSTRUCTION FOR GAS-ENGINES.

No. 867,207.  Specification of Letters Patent.  Patented Sept. 24, 1907.

Application filed December 21, 1906. Serial No. 348,855.

*To all whom it may concern:*

Be it known that I, ARCHIBALD J. MCCOLLUM, a citizen of the United States, residing in Chicago, county of Cook, and State of Illinois, have invented certain new and useful Improvements in Fly-Wheel Constructions for Gas-Engines, of which the following is a specification.

My invention relates to that class of gas engines in which the fly wheel is a part of the crank, and is designed to provide a construction which will permit of a material addition to the bearing surface of the journal bearings with a minimum of width, and is more particularly adapted for use upon motor cycles.

In gas engines used upon motor cycles it is very difficult to get a narrow engine suitable for this class of work without greatly decreasing the bearing surface, with the result that the engine runs hot in a comparatively short time.

My invention has for its object to avoid this objection and my means of accomplishing this result may be more readily understood by having reference to the accompanying drawings, which are hereunto annexed and are a part of this specification, in which, the figure is an elevation of my improved fly wheel, one of the walls being shown in section to disclose the interior construction.

Similar reference numerals refer to similar parts throughout the entire description.

In the drawings, 1 indicates the internal fly wheel. This is constructed as better shown in the sectional view with an annular disk 2 having an annular rib 3 at its periphery. A hub or boss 4 is located at a suitable distance from the center of the disk 2. This boss has a taper socket 5 counter bored in its interior, to which is fitted the wrist pin 6 of the connecting rod 7. By making this hole tapered, it is obvious, from an examination of the drawings, that not only the bearing surface of the pin 6 is greatly increased but the shear is resisted by the largest possible mass of metal, the pin 6 being provided with a bushing 14 of bronze or other suitable metal and held in position by a nut 15. A hub 8 is located at the center of the disk 2 and extends outwardly for a distance corresponding to the width of the annular rib 3. This hub has an opening extending through its center in which is fitted the reduced end 9 of the rod 10. The inner face of the disk 2 is countersunk, as shown at 11, and the reduced end 9 of the rod 10 is headed up over this countersink securing the rod 10 firmly and rigidly to the disk 2. The surface of the rod 10 and the hub 8 is then ground to size and a hardened steel sleeve 12 is fitted over the rod 10 and the exterior surface of the hub 8. This hardened sleeve, as can be seen from the drawings, extends to the outer face of the disk 2, the wall of which may be approximately one-fourth or three-sixteenths of an inch in thickness, and said sleeve provides for a smooth, even surface of increased diameter furnishing an extended bearing surface which cannot be obtained except by this method.

The rod 10 extends beyond the end of the sleeve 12 forming a suitable mounting for a sprocket wheel or pulley, as is desired, threads 13 cut upon the end of the rod 10 provide for a lock-nut to hold the driving member in position, although it is obvious that any other form of fastening may be utilized for this purpose without departing from the spirit of my invention.

By following this form of construction it becomes possible to greatly reduce the width of the crank and at the same time preserve a sufficiently long bearing to run cool and that without sacrificing the required strength.

It is possible that changes may suggest themselves to mechanics in constructing this crank and I do not wish to be limited to the precise form of construction shown, as there are obviously many minor changes which could be made without departing from the spirit of my invention.

Having described my invention, what I regard as new, and desire to secure by Letters Patent, is:

1. A fly wheel, said wheel being constructed of two disks each of which has an annular rib at its periphery, an outwardly extending boss located on each of said disks, there being a taper socket in said bosses, an outwardly extending hub at the center of each of said disks, a rod mounted in each of said hubs whose external diameters are coincident with the external diameters of the hubs, each rod having means for securing and holding it in position, and a steel sleeve fitted over each rod and the exterior surface of the adjacent hub, for the purpose set forth substantially as described.

2. A fly wheel, said wheel being constructed of two disks each of which has an annular rib at its periphery, an outwardly extending boss located on each of said disks, there being a taper socket in said bosses, an outwardly extending hub at the center of each of said disks, a rod mounted in each of said hubs, whose external diameters are coincident with the external diameters of the hubs, each rod having means for securing and holding it in position, and a steel sleeve fitted over each rod and the exterior surface of the adjacent hub, there being threads cut upon the ends of said rods, for the purpose set forth substantially as described.

3. A fly wheel, said wheel being constructed of two disks each of which has an annular rib at its periphery, an outwardly extending boss located on each of said disks, there being a taper socket in said bosses, an outwardly extending hub at the center of each of said disks, a rod mounted in each of said hubs whose external diameters are coincident with the external diameters of the hubs, each rod having means for securing and holding it in position, a steel sleeve fitted over each rod and the exterior surface of the adjacent hub, there being threads cut upon the ends of said rods, and a connecting rod mounted in said taper socket, for the purpose set forth, substantially as described.

4. A fly wheel, said wheel being constructed of two disks each of which has an annular rib at its periphery, an outwardly extending boss located on each of said disks, there being a taper socket in said bosses, an outwardly extending hub at the center of each of said disks, a rod mounted in each of said hubs whose external diameters are coincident with the external diameters of the hubs, the inner end of each rod being riveted, securing the rod rigidly to the disk, for the purpose set forth, substantially as described.

ARCHIBALD J. McCOLLUM

Witnesses:
H. P. STEWART,
B. F. HORSTING.